United States Patent [19]

Weldon

[11] Patent Number: 5,184,417
[45] Date of Patent: Feb. 9, 1993

[54] FLEA TRAP APPARATUS

[76] Inventor: Cheryl D. Weldon, 7351 Westchester Dr., Indianapolis, Ind. 46226

[21] Appl. No.: 907,582

[22] Filed: Jul. 2, 1992

[51] Int. Cl.⁵ .......................... A01M 1/02; A01M 1/20
[52] U.S. Cl. ........................................ 43/107; 43/113; 43/121; 43/122; 43/139
[58] Field of Search ................. 43/107, 113, 121, 122, 43/139

[56] References Cited

U.S. PATENT DOCUMENTS

| | | | |
|---|---|---|---|
| 1,482,420 | 2/1924 | Wilson | 43/113 |
| 1,586,484 | 5/1926 | Suggs | 43/139 |
| 2,694,879 | 11/1954 | Stoll | 43/122 |
| 2,807,116 | 9/1957 | Finley | 43/139 |
| 4,953,320 | 9/1990 | Nelson | 43/121 |
| 5,014,460 | 5/1991 | Patti | 43/107 |

Primary Examiner—Kurt C. Rowan
Attorney, Agent, or Firm—Leon Gilden

[57] ABSTRACT

A flea trap includes a cylindrical housing having a housing lower edge received in contiguous communication with a base upper edge of a housing base. The housing base includes a desiccant powder container receiving a desiccant powder therewithin, with a housing fan and heating grid positioned over the desiccant powder to direct heat and air movement exteriorly of the housing to attract fleas within the housing for their reception within the desiccant powder.

6 Claims, 4 Drawing Sheets

FLEA TRAP APPARATUS

BACKGROUND OF THE INVENTION

1. Field of the Invention

The field of invention relates to flea trap apparatus, and more particularly pertains to a new and improved flea trap apparatus wherein the same is arranged to project heat and air movement, as well as provide for coloration to attract fleas interiorly of the flea trap structure.

2. Description of the Prior Art

Flea trap apparatus of various types have been utilized in the prior art to provide for attracting of fleas for their extermination, such as exemplified in U.S. Pat. No. 4,700,506 to Williams wherein a flea trap includes a shallow flat pan containing a sticky substance therewithin, with a light member positioned over the pan to attract fleas thereto.

U.S. Pat. No. 4,729,147 to Armbruster sets forth a pet grooming structure having a vacuum for directing fleas into the organization by way of the vacuum structure.

As such, it may be appreciated there continues to be a need for a new and improved flea trap apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of flea trap apparatus now present in the prior art, the present invention provides a flea trap apparatus wherein the same is arranged to provide for desired coloration as well as air movement and heat relative to the organization for attracting fleas thereto. As such, the general purpose of the present invention, which will be described subsequently in greater detail, is to provide a new and improved flea trap apparatus which has all the advantages of the prior art flea trap apparatus and none of the disadvantages.

To attain this, the present invention provides a flea trap including a cylindrical housing having a housing lower edge received in contiguous communication with a base upper edge of a housing base. The housing base includes a desiccant powder container receiving a desiccant powder therewithin, with a housing fan and heating grid positioned over the desiccant powder to direct heat and air movement exteriorly of the housing to attract fleas within the housing for their reception within the desiccant powder.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved flea trap apparatus which has all the advantages of the prior art flea trap apparatus and none of the disadvantages.

It is another object of the present invention to provide a new and improved flea trap apparatus which may be easily and efficiently manufactured and marketed.

It is a further object of the present invention to provide a new and improved flea trap apparatus which is of a durable and reliable construction.

An even further object of the present invention is to provide a new and improved flea trap apparatus which is susceptible of a low cost of manufacture with regard to both materials and labor, and which accordingly is then susceptible of low prices of sale to the consuming public, thereby making such flea trap apparatus economically available to the buying public.

Still yet another object of the present invention is to provide a new and improved flea trap apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
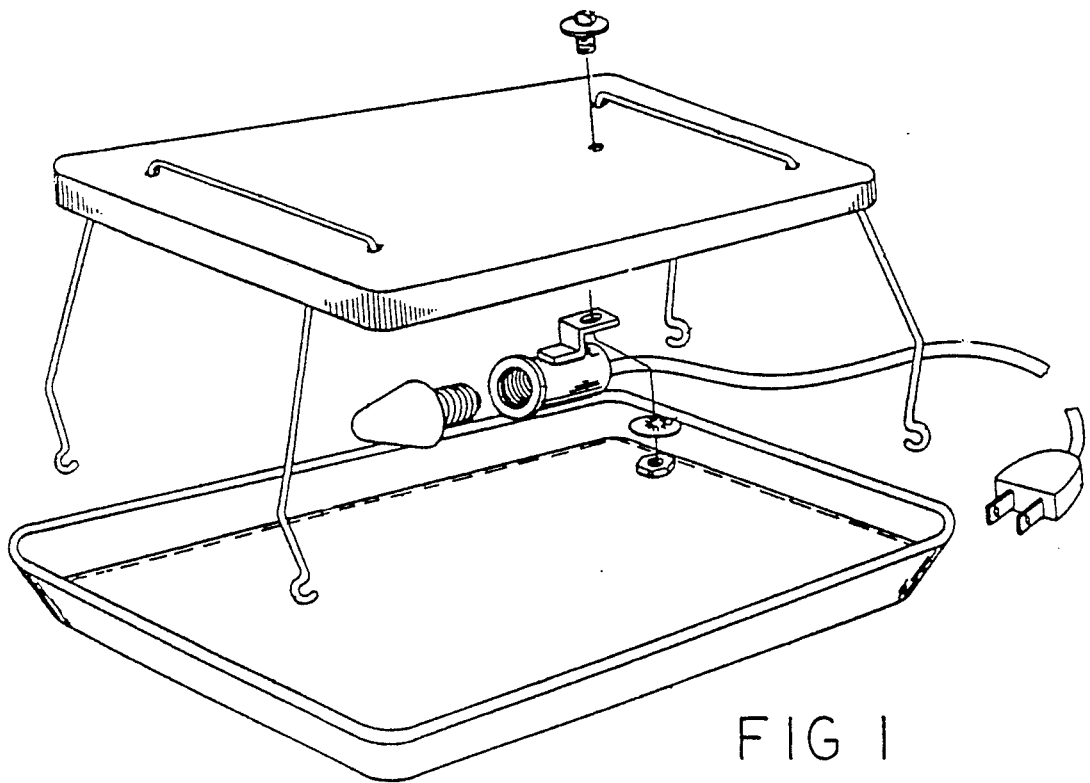
FIG. 1 is an isometric illustration of a prior art flea trap apparatus.
Figure 2:
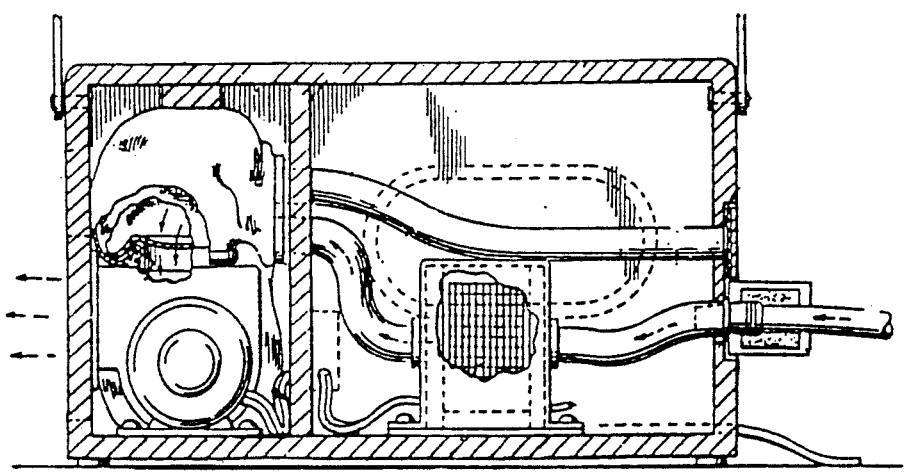
FIG. 2 is an orthographic cross-sectional illustration of a prior art flea trap apparatus.

With reference now to the drawings, and in particular to FIGS. 1 to 5 thereof, a new and improved flea trap apparatus embodying the principles and concepts of the present invention and generally designated by the reference numeral 10 will be described.

Figure 3:
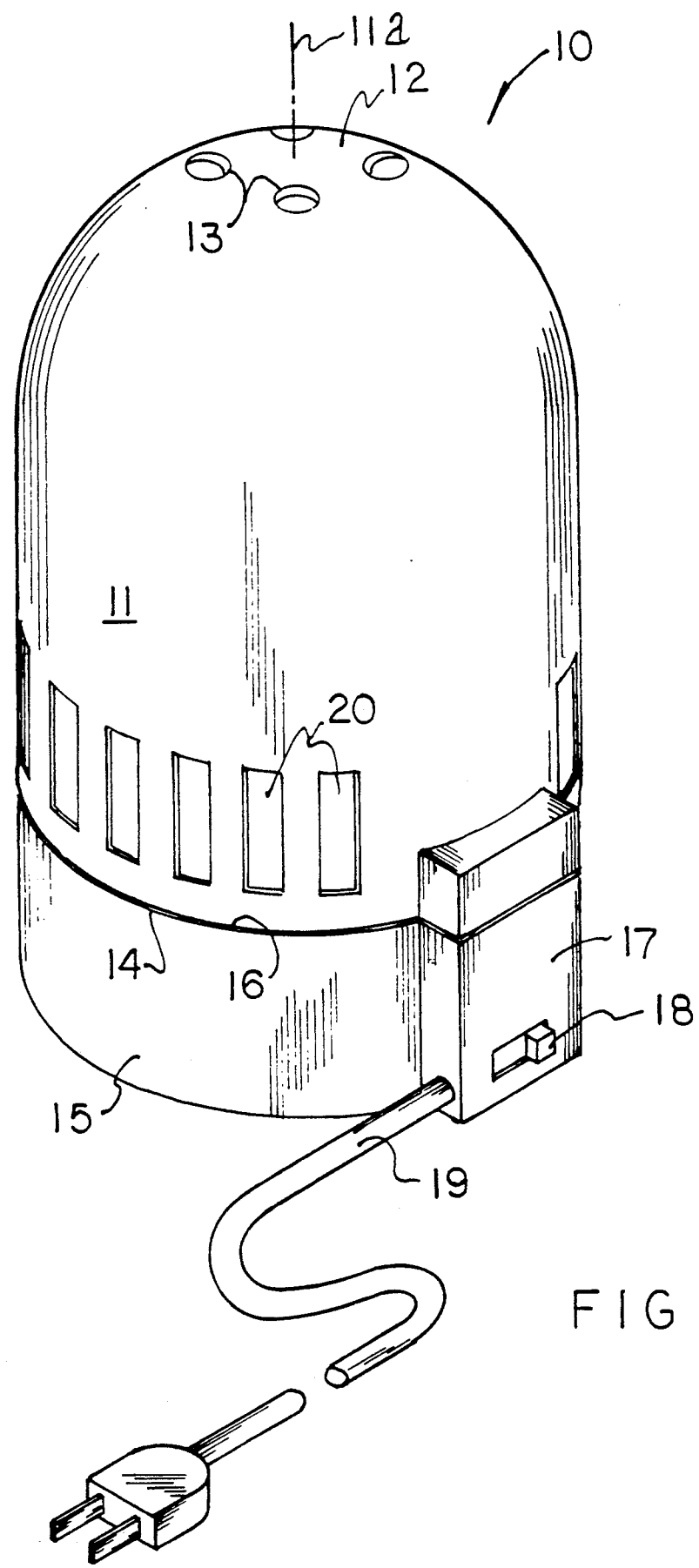
FIG. 3 is an isometric illustration of the instant invention.
Figure 4:
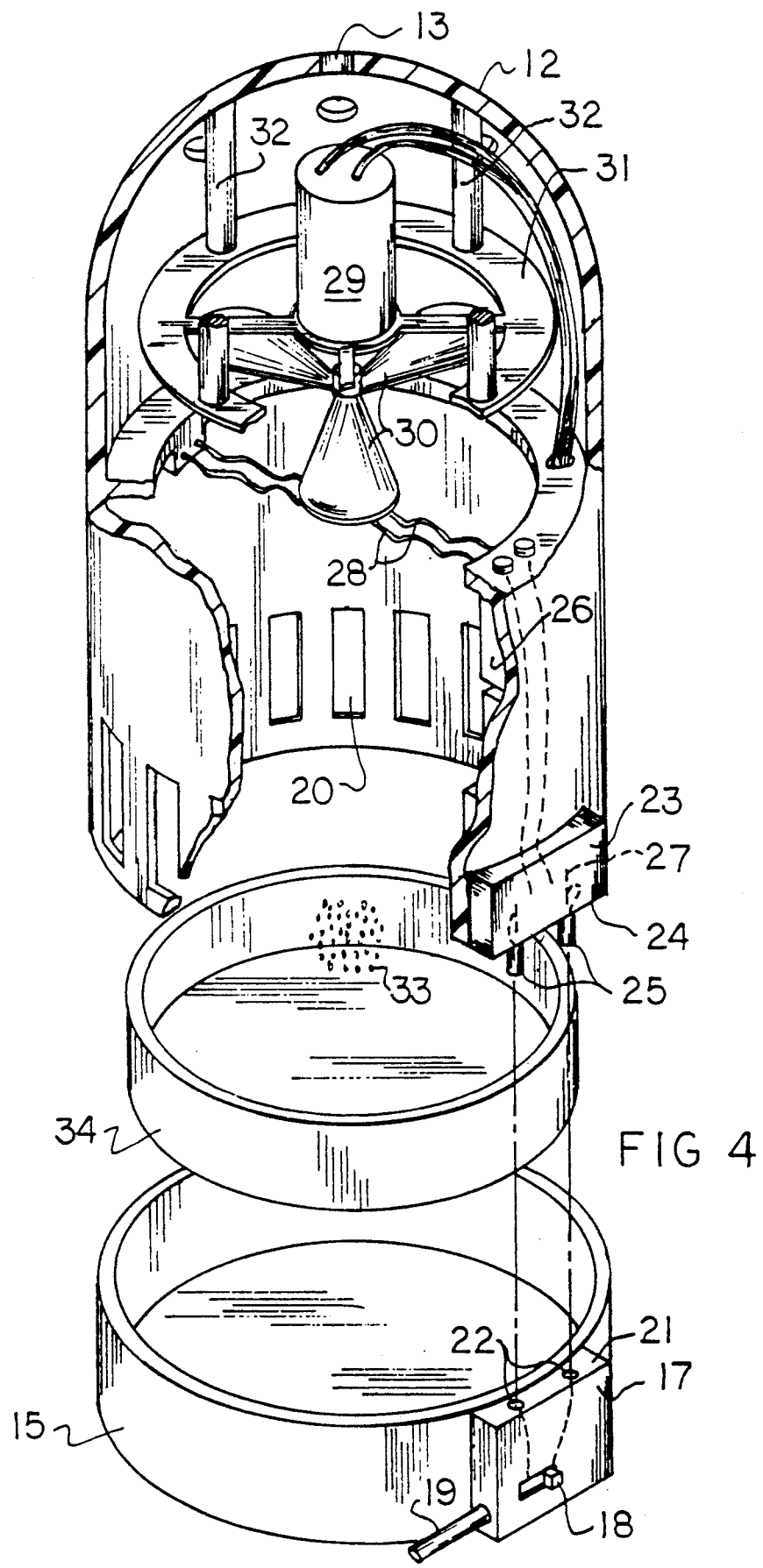
FIG. 4 is an isometric exploded illustration of the invention, partially in section, illustrating the various components associated therewith.

More specifically, the flea trap apparatus 10 of the instant invention essentially comprises a cylindrical housing 11 symmetrically oriented about a housing axis 11a having a semicylindrical roof portion 12 formed with a plurality of vent apertures 13 directed therethrough. The housing 11 is formed with a housing annular lower edge 14 in contiguous mounted communication relative to an annular base upper edge 16 of a cylindrical housing base 15, as illustrated in FIG. 3. A switch housing 17 is mounted to the housing base 15 having an on/off switch 18 arranged to direct electrical power from an electrical power supply line 19 into the organization to operate the various components thereof, in a manner to be discussed below. An annular array of housing access slots 20 are directed through the cylindrical housing 11 in adjacency to the housing annular lower edge 14, wherein the slots 20 are generally parallel relative to one another to permit access therethrough of a flea finding access to interiorly of the housing 11. It should be noted that typically the cylindrical housing 11 is of a red or blue coloration that is found to be most advantageously attractive to a flea. Further, as air movement and heat have been found in practical studies to attract fleas, interiorly of the housing is a blower motor 29 coaxially aligned relative to the axis 11a in adjacency relative to the roof 12 mounted by a fan mounting ring 31 having ring support rods 32 orthogonally mounted to the ring 31, with the support rods 32 in a parallel relationship relative to the axis 11a and secured to an interior surface of the roof 12. The blower motor 29 includes a fan blade assembly 30 to direct air from the vent apertures 13 through the slots 20 and past heater filaments 28 to direct heated therefrom as the heat and air movement, as noted above, are attractive to fleas.

The switch housing 17 is formed with a switch housing top wall 21 having top wall bores 22. A connector housing 23 mounted adjacent the housing annular lower edge 14 includes a connector housing bottom wall 24, including a plurality of connector lugs 25 that are received within the bores 22 to effect electrical communication to the on/off switch 18. In this manner, the organization is not operative until the upper and lower sections are secured together.

Figure 5:
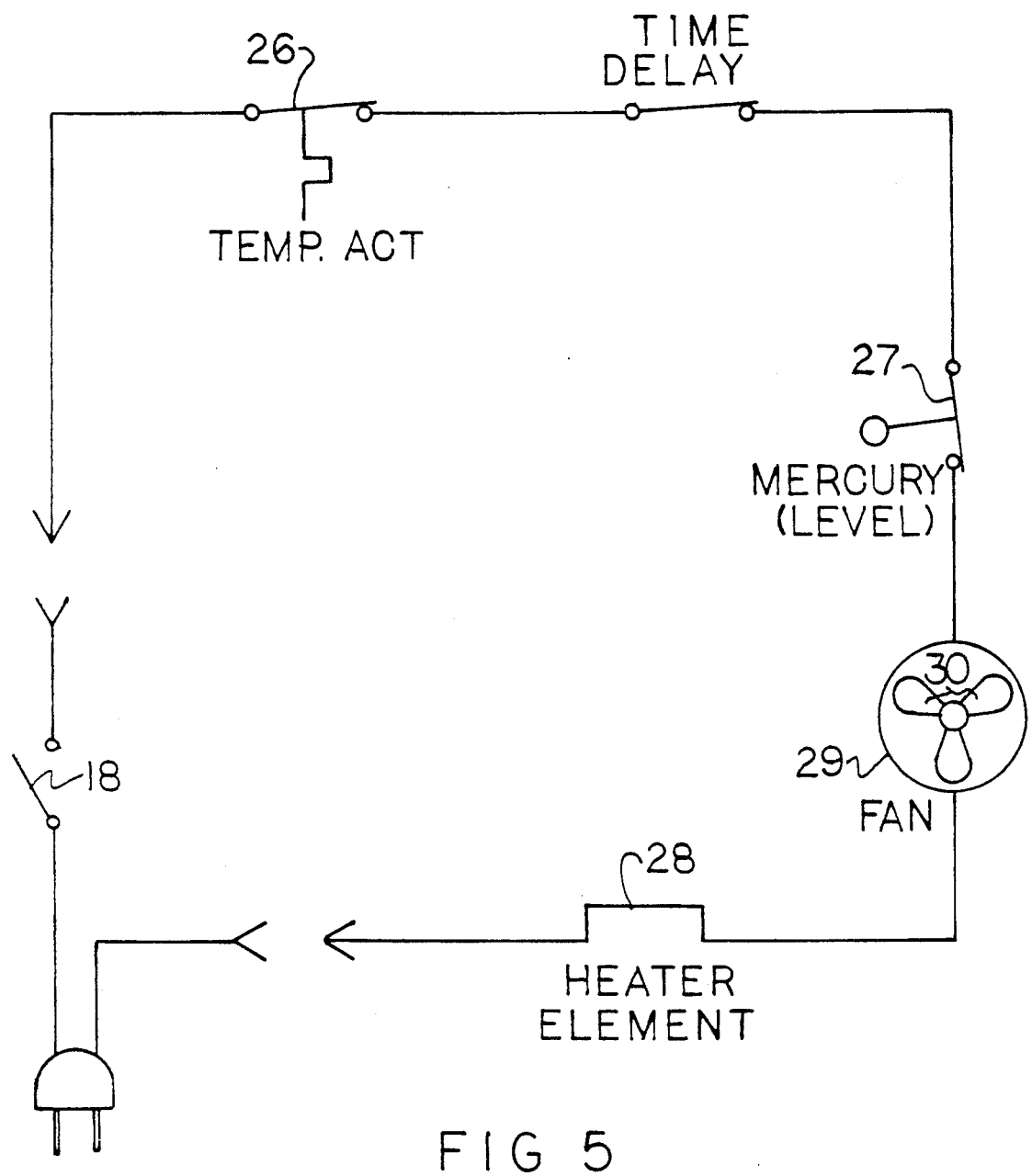
FIG. 5 is an electrical diagrammatic illustration of the electrical circuitry utilized by the invention.

It should be further noted that a temperature sensor switch 26 is positioned within the housing 11 to effect deactivation of the organization should temperature therewithin exceed a predetermined temperature, wherein the temperature sensor switch 26 is further formed with a time delay to permit adequate time to permit a cooling down interiorly of the housing 11, in a manner as indicated in FIG. 5. A mercury level switch 27 is mounted within the connector housing 23, whereupon tippage of the organization 10 effects deactivation of electrical energy to the fan and heater filaments 28.

A cylindrical dish 34 is complementarily received within the housing base 15 filled with an anhydrous desiccant powder 33 therewithin, wherein a flea being coated with such powder is immediately subject to extermination without the use of caustic chemicals, pesticides, and the like.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A flea trap apparatus, comprising,
   a cylindrical housing, the cylindrical housing symmetrically oriented about a housing axis, with the cylindrical housing having a roof, and the roof including a plurality of vent apertures directed therethrough, and
   the housing having an annular lower edge, and
   a housing base, the housing base including an annular upper edge, with the annular lower edge arranged for contiguous communication with the annular upper edge, and
   a switch housing mounted to the housing base, the switch housing having an on/off switch mounted therein, and
   an electrical power supply line in electrical communication with the on/off switch directed into the switch housing, and
   a plurality of housing slots arranged in an annular array through the cylindrical housing adjacent the housing annular lower edge, and
   electrical resistance heating means mounted within the housing for heating of ambient air within the housing, and
   blower means mounted within the housing above the heating means for directing air past the heating means and exteriorly of the housing through the slots.

2. An apparatus as set forth in claim 1 including a connector housing mounted to the cylindrical housing adjacent the annular lower edge, wherein the connector housing includes a connector housing bottom wall, and the switch housing includes a switch housing top wall, the switch housing top wall includes a plurality of top wall bores, and the connector housing bottom wall includes a plurality of connector lugs, wherein the connector lugs are received within the top wall bores for electrical communication with the electrical power supply line, and the heating means are in electrical communication with the connector lugs.

3. An apparatus as set forth in claim 2 including a mercury level switch mounted within the connector housing for discontinuing electrical communication between the connector lugs, and the heating means upon tipping of the cylindrical housing.

4. An apparatus as set forth in claim 3 including a temperature sensor switch mounted within the housing in electrical communication with the heating means and the mercury level switch, wherein the temperature sensor switch includes a time delay means for discontinuing electrical communication between the connector lugs and the heating means for predetermined time interval subject to a temperature within the cylindrical housing exceeding a predetermined temperature.

5. An apparatus as set forth in claim 4 wherein the fan means includes a blower motor coaxially aligned relative to the axis having a fan blade assembly mounted to a lower end of the fan motor, and a fan mounting ring arranged in surrounding relationship relative to the fan motor secured to the fan motor to maintain the fan motor in a coaxially aligned orientation relative to the axis, with a plurality of support rods mounted to the fan mounting ring and to an interior surface of the roof.

6. An apparatus as set forth in claim 5 including a cylindrical dish member positioned complementarily within the housing base, and the cylindrical dish member including anhydrous desiccant powder contained therewithin.

* * * * *